Figure 4:
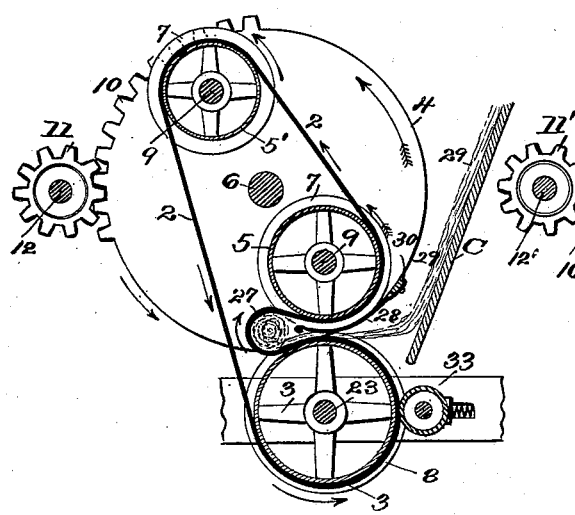

(No Model.)
3 Sheets—Sheet 1.
W. A. ROSS.
BALING PRESS.
No. 579,897.
Patented Mar. 30, 1897.
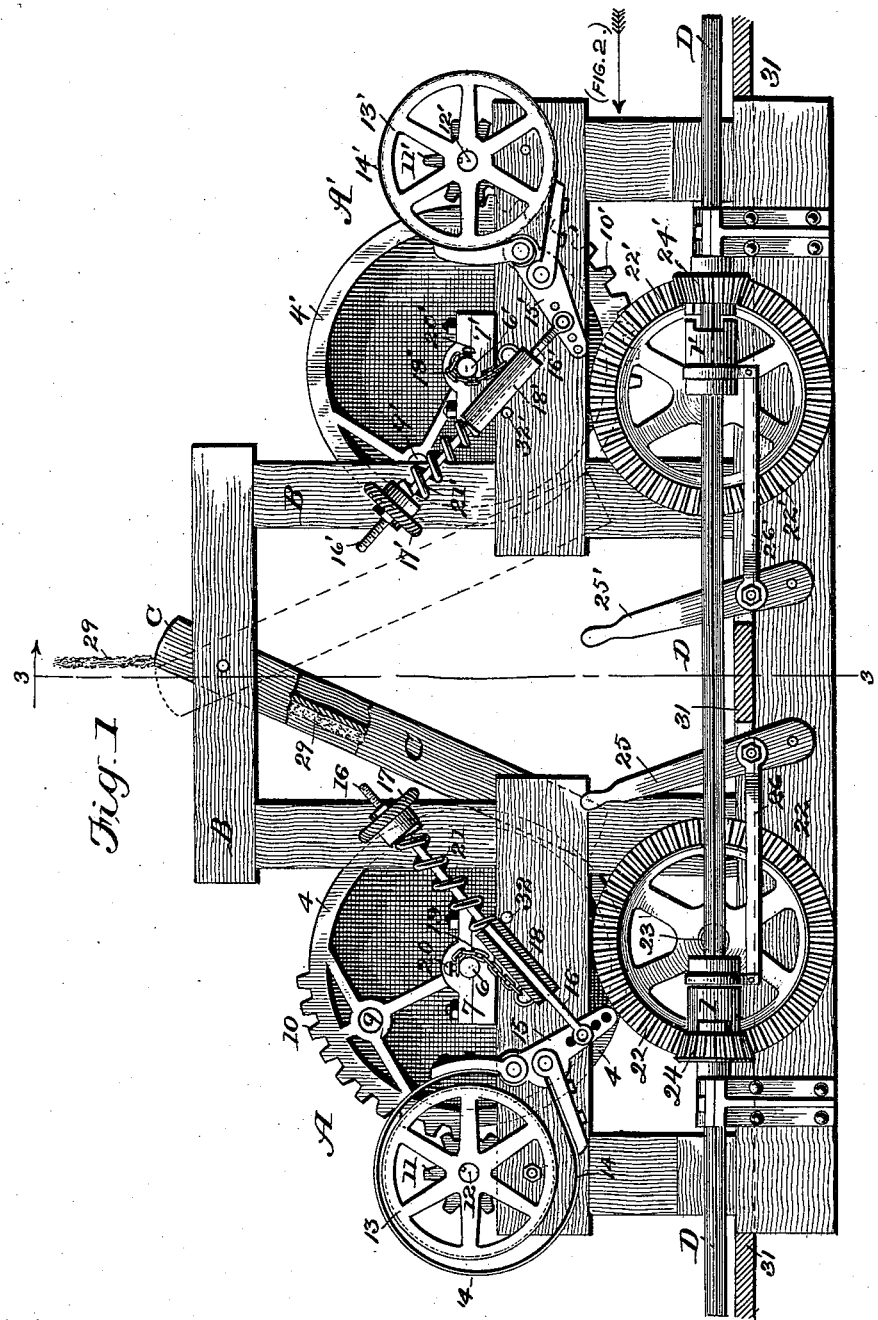
WITNESSES:
Jos. A. Ryan
Amos W Hart
INVENTOR
William A. Ross.
BY Munn & Co
ATTORNEYS.

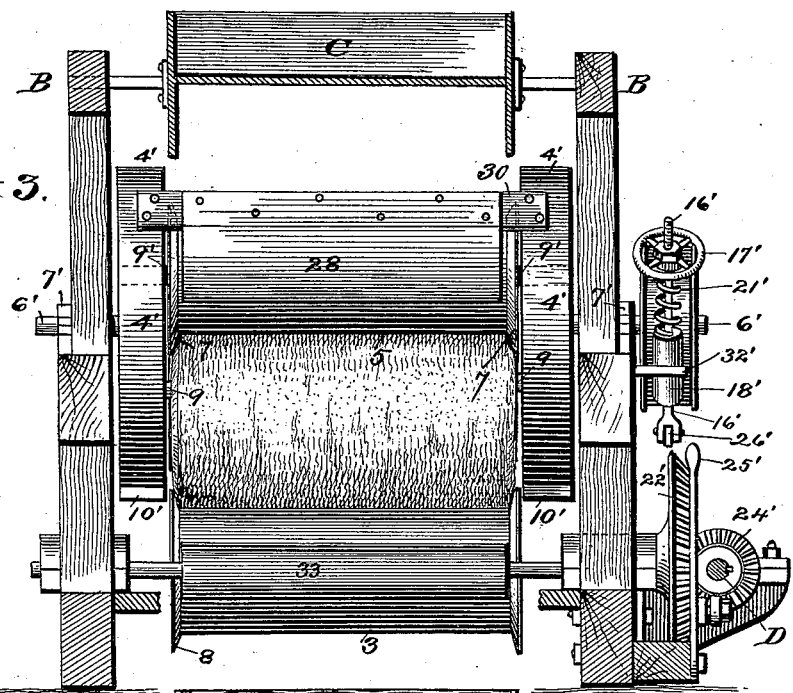

(No Model.) 3 Sheets—Sheet 3.

W. A. ROSS.
BALING PRESS.

No. 579,897. Patented Mar. 30, 1897.

WITNESSES:
Jos. A. Ryan
Amos W Hart

INVENTOR
William A. Ross.
BY Munn & Co.
ATTORNEYS.

UNITED STATES PATENT OFFICE.

WILLIAM A. ROSS, OF HICO, TEXAS.

BALING-PRESS.

SPECIFICATION forming part of Letters Patent No. 579,897, dated March 30, 1897.

Application filed March 20, 1896. Serial No. 584,179. (No model.)

*To all whom it may concern:*

Be it known that I, WILLIAM ANDREW ROSS, of Hico, in the county of Hamilton and State of Texas, have invented a new and useful Improvement in Bale-Winding Machines, of which the following is a specification.

My invention is an improvement in that class of machines for compressing and baling cotton and other fibrous materials which form a cylindrical bale by winding the raw material upon itself. In one of the two most prominent types or kinds of such machines to which mine is most closely related the cotton bat or film received from the condenser is wound around a core or cylindrical roller and is compressed while being so wound by means of two rotating rollers, one of which is movable toward or from the other. In machines of the other type or kind the cotton-bat is compressed in the bight or loop of a belt, which is weighted and passes over two parallel rollers fixed in the same horizontal plane, said bight or loop being formed below the rollers and maintained by revoluble circular heads or disks, which are arranged at the ends of the loop and serve also to shape the ends of the bale.

In my machine I dispense with a core, also with fixed horizontal rollers and revoluble heads or disks for forming a bight or loop in a belt, also with a weight suspended from such belt. I arrange an endless apron or belt to run on three elongated and flanged drums or pulleys, one of which is fixed in the frame of the machine, while the other two are arranged between and journaled in two parallel heads or disks that receive a rotary reciprocating motion, whereby said drums or pulleys are changed in position and the apron caused to slacken to enlarge its loop as required by the growth of the forming bale. The rotation of the aforesaid heads or disks is caused by the increasing volume of the bale, and this movement is resisted by other mechanism whose action is automatically regulated to give a gradually-increased compression to the bale as it increases in diameter.

I employ duplicate bale-forming mechanisms or apparatus which are arranged in the same horizontal plane, and a pivoted swinging chute is located between them, whereby cotton is fed to one bale-forming apparatus while the bale already completed in the other is being removed, so that the compressing and baling operation is a practically continuous one.

Having thus indicated some of the main features of my invention, I will proceed to describe it by reference to the accompanying drawings, three sheets.

Figure 5:
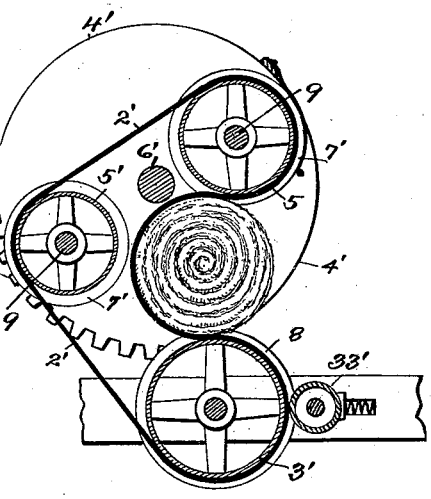
Figure 6:
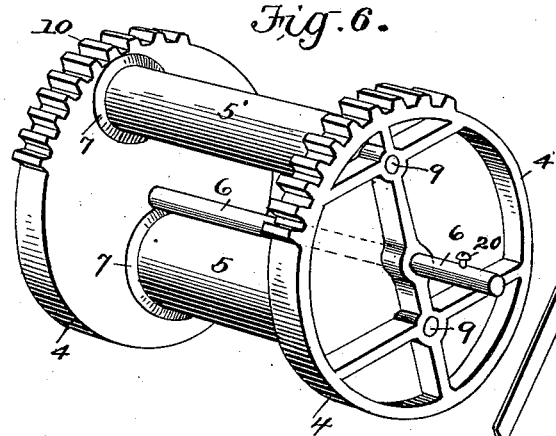
Figure 7:
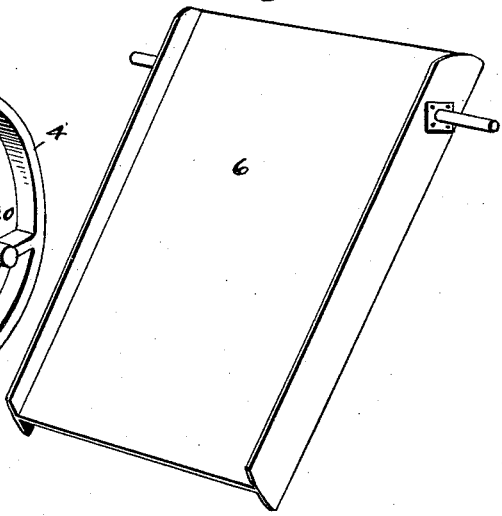

Figure 1 is a side elevation of my improved machine, showing the duplicated apparatus or mechanism. Fig. 2, Sheet 2, is an end view of the machine, showing the position of parts before a bale is formed. Fig. 3 is a vertical central section of the machine, showing the position of parts after a bale has been formed. (See line 3 3, Fig. 1.) Fig. 4, Sheet 3, is a vertical section of one of the bale-winding mechanisms, showing the parts in the position they occupy at the beginning of their operation. Fig. 5 is a similar section of the same mechanism when the bale has been wound to its full size. Fig. 6 is a perspective view of the rotatable portion of a bale-winding apparatus proper. Fig. 7 is a perspective view of the cotton-chute.

The two duplicate sets of compressing and baling apparatus A and A' (shown in Fig. 1) are arranged side by side in the same frame B, but separated by a space which accommodates the swinging cotton-chute C, pivoted in the upper portion of such frame, but is also sufficient to accommodate the workman and also to receive a small car (not shown) into which the bales may be delivered when completed. The two apparatus A A' are driven intermittingly and alternately from the same continuously-rotating shaft D, arranged horizontally at one side of the frame B, the same being alternately connected with the compressing apparatus A A' by means of clutches 1 1' and bevel-gearing, as will be hereinafter further described.

The two compressing apparatus or mechanisms A A' being alike, description of one will suffice for both, but to distinguish them from each other the numerals of the apparatus A' are primed. The principal parts of each such compressing and baling apparatus proper are the endless belt or apron 2, Fig. 4, the rotatable flanged pulley or drum 3, fixed in the frame B, the two parallel heads or disks 4, Fig. 6, and the two flanged pulleys or drums 5 5', that are journaled in and rotate in such heads 4. The latter are keyed on a central horizontal axle or shaft 6, journaled in suitable boxes 7, secured on the parallel side beams of frame B. The pulleys or drums 3 5 5' have a radial circumferential flange 8 at each end, and the horizontal distance between the two flanges 8 of a drum is the width of the apron that runs on the three pulleys and the length of the bales to be formed. The two pulleys or drums 5 5' have axles or shafts 9, that are journaled in boxes fixed in the inner opposite sides of the heads 4, and said pulleys 5 5' are arranged on opposite sides of the shaft 6, and also at different distances from the latter for a purpose hereinafter stated. Curved or segment racks 10 are attached to the rims of the heads or disks 4 and with them mesh two pinions 11, that are fixed on a horizontal shaft 12, journaled in boxes secured on frame B. On one end of this shaft 12 is keyed a friction pulley or wheel 13. A friction band or strap 14 is adapted to grip said wheel, its ends being attached to a lever 15, pivoted to the side beam of the frame. This lever 15 is connected with the shaft 6 of the heads 4 by the following means: A rod 16, Fig. 1, having a nut 17, provided with a hand-wheel applied to its threaded free end, is pivoted to the longer arm of the lever 15, and a sleeve 18 is adapted to slide on the rod, as shown. A chain 19 connects this sleeve 18 with a radial pin 20, fixed in the elongated end of the shaft 6 of heads 4, and a spiral spring 21 is interposed between the sleeve and nut.

A bevel-gear 22, Figs. 1 and 4, is keyed on the shaft 23 of lower fixed drum or pulley 3, and a pinion 24 on the horizontal drive-shaft D meshes with it. The said pinion 24 rotates free on the drive-shaft D, but may be locked with it by means of a clutch 1, that slides on the splined portion of said shaft, it being adjusted by a lever 25 and connecting-rod 26.

The apron-driving pulley 3, Fig. 4, is keyed on the aforesaid shaft 23 and is thus driven by the latter through the medium of the bevel-pinion 24 and gear 22, connecting it with the power-shaft, and said pulley 3 in turn drives the apron or belt 2 in the direction indicated by arrows, Fig. 4, which movement tends to hold the bale in the loop 27 of the apron. This feature—the driving of the apron or belt by means of one stationary pulley and allowing it to run on idle pulleys that are movable in position as to such driving-pulley—is a particularly advantageous and valuable one, and I propose to make it the subject of a claim in another application.

A portion 27 of the endless apron 2, Fig. 4, is doubled between the drums or pulleys 3 and 5 by means of a curved shield 28, which also prevents contact of the upper portion of the loop 27 with the cotton bat or film 29. Such shield 28 is attached to and held in place by a cross-bar 30, secured to the peripheries of the heads or disks 4.

The swinging chute C, Figs. 1 and 7, is open on opposite sides, so that it is practically a double trough. This construction adapts it to deliver the cotton bat or film to either of the two bale-forming mechanisms, according as it inclines one way or the other. Any suitable device may be used to hold it in either position. As shown in full lines, Fig. 1, it is in position to deliver a cotton bat or film 29 to the left-hand apparatus A. Upon screwing down the hand-wheel nut 17 on the rod 16, the friction-band 14 will be caused to grip the wheel 13 of the pinion-shaft 12, as illustrated on the right hand, Fig. 1, and the apparatus A is then ready to operate as required.

To start a bale, the clutch 1 is thrown into engagement with the pinion 24, and the cotton 29, sliding down the chute C, passes into the loop 27, Fig. 4, of the apron 2, Fig. 4, and is convoluted or rolled upon itself, so that the roll gradually grows to the full size required. The direction of movement of all the parts is indicated by arrows in Figs. 4 and 5. As the bale increases in diameter it forces the pulley 5 upward, and the opposite one, 5', necessarily descends correspondingly, so that proper slack is given to the apron 2 to form the gradually-expanding loop 27. Such slack of the apron is increased by the arrangement of the smaller drum or pulley 5' farther than drum 5 from the shaft 6 of heads 4, the important feature being that the outer side of the pulley 5' shall be farther from the axis 6 than the outer side of the pulley 5. The shifting of the drums 5 5', one up and the other down, involves oscillation of the heads or disks 4 on their shaft 6 and the consequent winding of the chain 21 on the latter, so that the sleeve 18 is pulled upward and the spring 21 further compressed, thereby increasing the tension of the friction-band 14 on wheel 13 through the medium of rod 16 and lever 15. This again hinders the oscillation of the heads or disks 4 through the medium of the shaft 12, pinions 11, and segment-racks 10, so that the resistance to growth of the forming bale is increased as its diameter increases, thereby giving it uniform density from center to circumference. In other words, the pressure applied to the bale is automatically increased as its diameter increases, and it is apparent such pressure may be graduated as desired by adjusting the nut 17 to give the spring 21 greater or less tension. So the bale may be wound to any desired density by varying the frictional resistance of the band 14 on the wheel 13. In Figs. 3 and 5 the bale is shown wound to full size and ready to be taken out.

In the formation of the bale the circular flanges 8, Fig. 4, on the ends of the drums 5 5' will guide the apron 2 and also shape or "square" the ends of the bale and make its length conform to the desired standard.

Bagging in a single piece (not shown) is applied to the formed bale by laying one edge of the same on the apron just below the chute, and the same will be carried around the bale.

Then the movement of the apparatus being arrested by disengaging the clutch 1 the edges of the bagging may be lapped and sewed or otherwise secured together, when the bale is ready to be discharged. This operation is effected in one apparatus, say A, while the opposite apparatus, A', is forming another bale, the chute C having been first duly shifted in position as soon as the bale proper has been formed in the apparatus first operated.

A floor 31, Fig. 1, is laid on the base-beams of frame B, and on it a car may be run between the bale-forming apparatus A A' and the finished bale delivered into it. The bale is removed by screwing the hand-wheel nut 17 up on the rod 16 until the chain 19 is slack enough to allow the sleeve 18 to drop on the stop-pin 32, Fig. 1, which projects from the side of frame B. Then the bale will fall out of the loop 27 of the apron 2. This result is mainly due to the action of gravity. It is apparent that by thus shifting the swinging chute C and feeding the cotton to the two apparatus A A' in succession, or alternately, and by removing a bale from one while another is forming in the other apparatus, as before described, the baling operation is rendered practically continuous, so that a great economy of time and labor is effected.

The heads or disks 4 and the drums 5 5', carried by them, Fig. 6, are practically balanced on the shaft 6, and may therefore be turned manually without difficulty. This is an important feature in practice, since it enables a workman to quickly and easily adjust the apparatus for operation.

I prefer to make the apron 2 of a good quality of rubber belting; but it may obviously be made of other materials. When made of metal, it is held in contact with the fixed drum 3 by a spring-pressed roller 33, Fig. 1. This roller is practically of use only at the beginning of the baling operation, since the required tension of the apron is subsequently maintained by the expansion of the bale itself.

The adjunctive bale-forming mechanism, consisting of the parallel heads or disks and the pulleys journaled therein and oscillating on the axis, is so constructed that the center of gravity is in the axis. The said mechanism being thus balanced it is adapted to be easily rotated manually and will remain stationary in any position or adjustment—a feature of much importance in practice.

In another application, Serial No. 618,906, I claim the particular arrangement of the pulleys 3 and 5 to each other, and also to the bight of the belt, or to the bale formed therein, whereby the pressure and strain incident to winding the bale are borne mainly by said pulleys rather than the belt.

I do not claim the combination with a single bat-forming apparatus of two sets of rotary cotton-pressing appliances and means for feeding the bat to either one of said appliances and for shifting the feed from either one to the other, whereby the process of forming in either one may go on while a previously-finished bale is being removed from the other, nor the combination of a traveling pressure-surface for compressing the bale, a brake device for resisting the movement of said traveling pressure-surface, and automatic means for gradually increasing the tension on said brake device.

What I claim is—

1. In a bale-winding machine, the combination, substantially as specified, of an endless traveling winding-apron, and three pulleys or drums over which such apron passes, two of said pulleys being movable about a common center relative to the third pulley which is fixed in the frame, whereby due expansion of the forming bale is allowed.

2. In a bale-winding machine, the combination of an endless apron, three rotatable pulleys or drums, around which said apron passes, the same being provided with radial flanges at their ends, and one of such pulleys being driven to cause the apron to travel, and the other two being movable relative to such driven one, whereby the apron is slackened as the bale increases in diameter, substantially as shown and described.

3. In a bale-winding machine, the combination, of an endless winding-apron, a flanged driven pulley or drum, which is journaled in the frame, two oscillating heads or disks, and two flanged pulleys or drums which are journaled in said heads, one of them being farther from the axis of the heads than the other, and the apron running on the three pulleys, and having normally sufficient slack to double between the fixed driven pulley and the adjacent movable one, substantially as shown and described, whereby, as the heads are caused to oscillate by the expansion of the forming bale in the loop between the driven pulley and the nearest movable one, the apron will be slackened proportionately to the rotative shifting of the two movable pulleys from the original position, as specified.

4. In a bale-winding machine, the combination of parallel oscillating heads, a fixed pulley, and two or more pulleys which are journaled in said heads and revolve therein, an endless apron that runs on the pulleys, and a tongue which is fixed to the heads opposite one of the movable pulleys and thus moved with it, the same projecting into the space between such movable pulley and the fixed pulley, when the parts are in position to begin forming the bale, and thus doubling the apron in such space and preventing contact of the cotton bat or film with the upper side of the loop, substantially as specified.

5. In a bale-winding machine, the combination, with three flanged pulleys or drums, one of which is fixed and the other two movable around a common center, and an endless apron that runs on such pulleys, of a pressure-roller that acts against one of such pulleys, to hold the apron in firm engagement with it as shown and described.

6. In a bale-winding machine, the combination substantially as described with a fixed pulley and endless traveling apron, of an adjunctive bale-forming mechanism which is adapted to oscillate and is counterbalanced as specified, the same being composed of parallel heads or disks and pulleys journaled in and between said heads, the said apron running on all three pulleys, substantially as shown and described.

7. In a bale-winding machine, the combination, with a fixed pulley, a carrier, and two pulleys mounted therein and movable as to the first pulley about a common center, of an endless apron running on the pulleys, and means for automatically resisting the oscillation of the movable pulley-carrier, substantially as shown and described.

8. In a bale-winding machine, the combination, with the bale-forming mechanism proper, composed of three pulleys, two of which are movable as to the other, oscillating parallel heads in which the movable pulleys are mounted, and an endless apron that runs on the pulleys, of a means for automatically applying an increased resistance to the expansion of the bale, which consists of pinions, a shaft and segment-racks, and a friction and spring tension apparatus connected with the axis of the part in which the movable pulleys are mounted to revolve, substantially as shown and described.

9. In a bale-winding machine, the combination, with the bale-forming mechanism proper, a portion of which is oscillatory on and about an axle or shaft, of an adjusting mechanism for automatically resisting the expansion of the bale, the same being arranged in the frame of the machine, in contiguity to one end of said shaft, and composed of a lever, a rod, a sleeve, spring, and friction band and wheel, and means arranged intermediately of the adjusting mechanism and bale-forming mechanism, for communicating motion from one to the other, substantially as shown and described.

10. The combination, with the rotary bale-forming apparatus or mechanisms, of a delivery-guide, or chute, which is pivoted between them, and has its opposite sides open, being thus in the form of a double trough having a central portion that serves as a bottom for each side of the chute, as shown and described.

WILLIAM A. ROSS.

Attest:
J. P. RODGERS,
M. A. COLE.